United States Patent [19]

Rose

[11] Patent Number: 4,543,486

[45] Date of Patent: Sep. 24, 1985

[54] METHOD AND APPARATUS FOR USING A PHOTOACOUSTIC EFFECT FOR CONTROLLING VARIOUS PROCESSES UTILIZING LASER AND ION BEAMS, AND THE LIKE

[75] Inventor: Douglas N. Rose, Macomb, Mich.

[73] Assignee: The United States of America as represented by the Secretary of the Army, Washington, D.C.

[21] Appl. No.: 502,419

[22] Filed: Jun. 8, 1983

Related U.S. Application Data

[63] Continuation-in-part of Ser. No. 496,366, May 20, 1983, Pat. No. 4,476,150.

[51] Int. Cl.$^4$ .................. H01J 37/304; B23K 15/00; B23K 26/00
[52] U.S. Cl. .................. 250/492.1; 219/121 LB; 219/121 LM; 219/121 ED; 73/606; 73/643; 374/4; 374/7
[58] Field of Search .............. 73/24, 606, 643; 374/4, 374/5, 7, 129; 250/492.1, 492.2, 492.3; 219/121 LB, 121 ED, 121 LM

[56] References Cited

U.S. PATENT DOCUMENTS 4,484,820 11/1984 Rosencwaig .................. 73/606 X
4,507,536 3/1985 Inoue .................. 219/121 LB

OTHER PUBLICATIONS

West et al., "Photoacoustic Spectroscopy", *Rev. Sci. Instrum.*, 54(7), Jul. 1983, pp. 797-817.

Favro et al., "Photoacoustic Microscopy . . . ", *Appl. Phys. Lett.*, 36(12), Jun. 15, 1980, pp. 953-954.
Rosencwaig, *Photoacoustics and Photoacoustic Spectroscopy*, 1980, pp. 296, 297.

*Primary Examiner*—Alfred E. Smith
*Assistant Examiner*—Jack I. Berman
*Attorney, Agent, or Firm*—Peter A. Taucher; Gail S. Soderling; Robert P. Gibson

[57] ABSTRACT

A novel control method and attendant apparatus for controlling other various methods/processes by utilizing a photoacoustic effect principle, whether or not the other various processes are with regard to solid or non-solid fluid media, but which other various processes use and require control of a primary excitation high energy beam and related beam-modulating and monitoring apparatus for establishing and detecting a photoacoustic effect. This method and apparatus require the use of appropriate beam generating and beam-generating power control means for controlling such an energy beam, the latter of which may be of the type including laser beams, microwave beams, x-rays and other electromagnetic wave beams, as well as ion, electron, particle, and molecular beams. Various beam modulating means may be used as well as various techniques for monitoring and detecting the photoacoustic effect, such techniques including different apparatus related to respectively different techniques, including a gas cell means, mirage generating means, piezoelectric detector means, infrared radiation detector means, and the reflective probe beam means.

26 Claims, 6 Drawing Figures

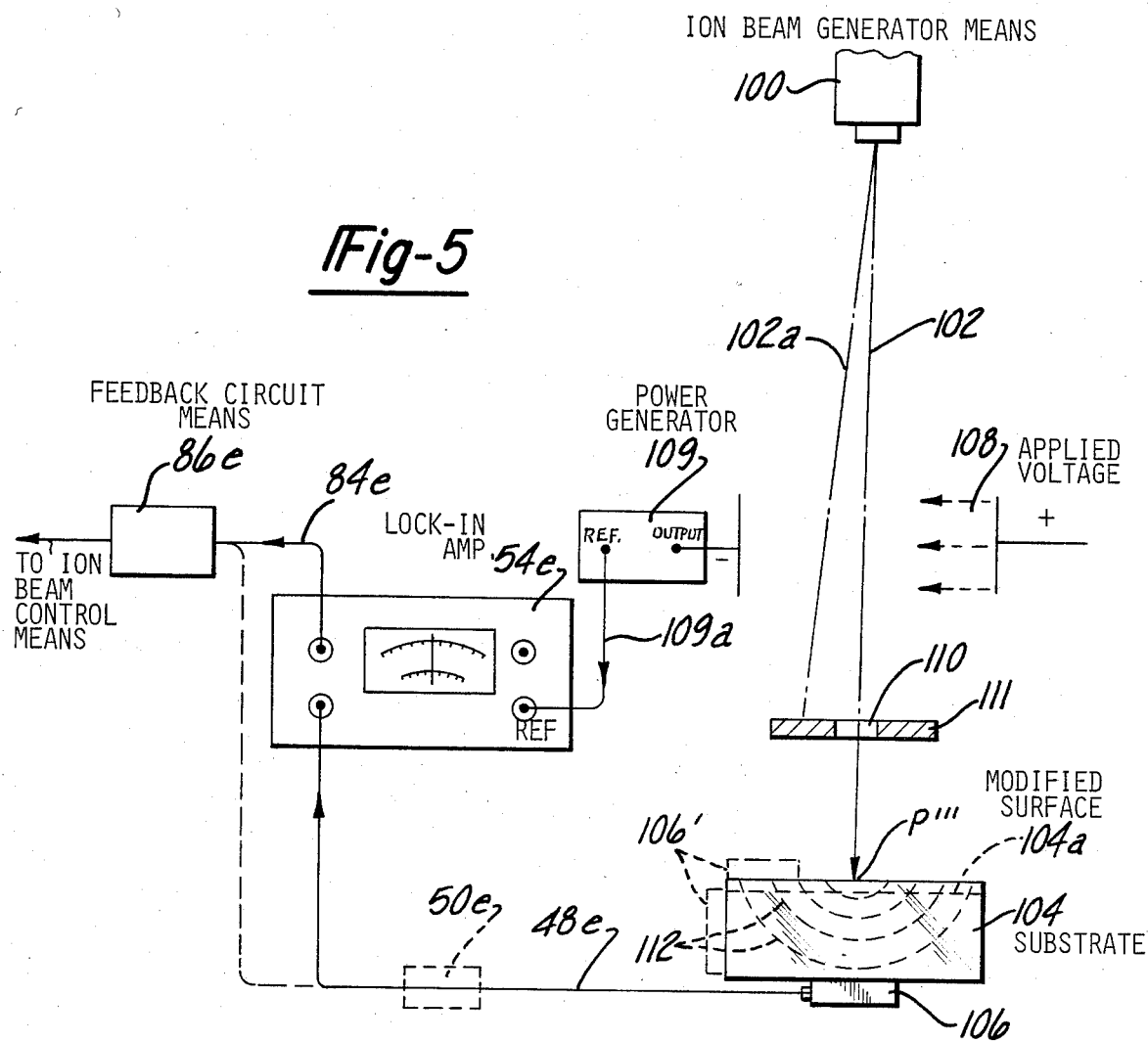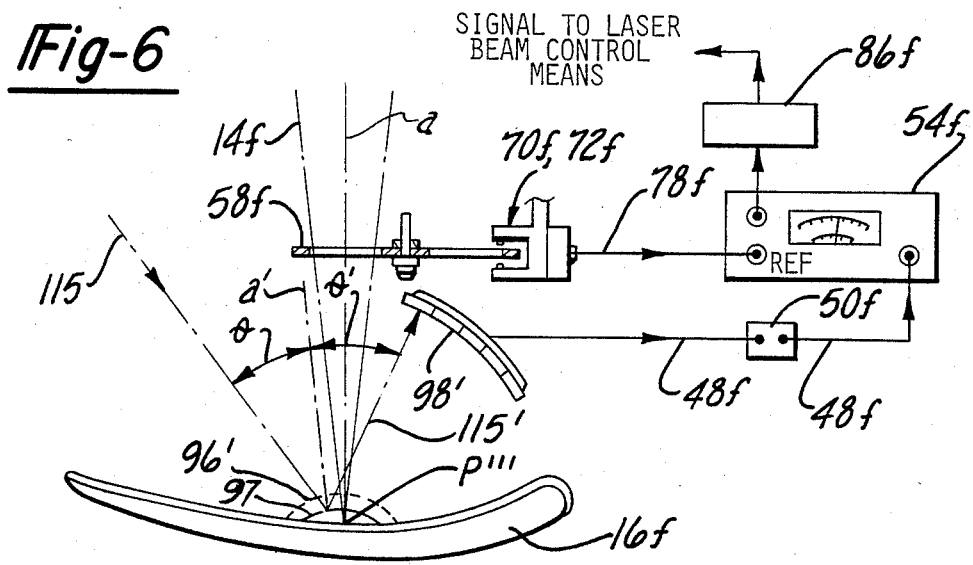

METHOD AND APPARATUS FOR USING A PHOTOACOUSTIC EFFECT FOR CONTROLLING VARIOUS PROCESSES UTILIZING LASER AND ION BEAMS, AND THE LIKE

GOVERNMENT INTEREST

The invention described herein may be manufactured, used, and licensed by or for the Government for governmental purposes without payment to me of any royalty thereon.

BACKGROUND OF THE INVENTION

The present invention is a continuation in-part application of my copending U.S. patent application Ser. No. 496,366 filed May 20, 1983, now U.S. Pat. No. 4,476,150, and relates broadly to utilizing a photoacoustic effect-producing process to generate or return information useful in turn to effectively control other processes. More particularly, the invention relates to utilizing various photoacoustic type modes or detection techniques for ultimately controlling certain processes by means of the photoacoustic mode detection of certain characteristic temperature variations in a processing area undergoing processing treatment by a primary excitation energy beam. The term "excitation" as used herein is to indicate that the selected type of beam is excited in a manner so as to establish a photoacoustic effect. Thus by such photoacoustic effect usage to monitor any chosen primary excitation beam, in conjunction with certain various beam modulating means, with various suitable transducer means to generate certain electrical signals, and together with ancillary electrical control circuit means, various types of processes can be effectively controlled by this unique control of the primary excitation beam. The range of specific processes contemplated to be controlled include not only laser beam annealing of thin-film-like ceramic material layers which have been applied to substrates by chemical vapor deposition (CVD), of the type described in my above-noted copending patent application, but also various other processes such as laser scribing and machining, laser-assisted chemical vapor deposition (LCVD), ion implantation to impart improved wear and fatigue-resistance properties, and corrosion resistance and the like, and production of powders via the chemical vapor deposition (CVD) process, among others.

The types of primary excitation beams may include laser beams, microwave beams, x-ray and other electromagnetic wave beams, as well as ion, electron, particle and molecular beams.

It is to be understood that the photoacoustic effect referred to and being primarily described herein may be considered in conjunction with photoacoustic microscopy. In this regard, the present primary interest lies in detecting and monitoring response differences of small localized spots or areas primarily on solids which are being periodically but relatively quickly heated by modulated primary excitation beams. That is, the main interest lies in detecting certain characteristic periodic temperature variations of the monitored spots or areas, whether with regard to a solid or non-solid fluid medium undergoing beam-related processing; and wherein the aforesaid temperature variations may manifest themselves in various ways such as pressure, index of refraction, thermoelastic, or infrared radiation emission changes. Thus, control of processes relating to the processing of gaseous mediums is also contemplated, such as monitoring a gas stream in a chemical manufacturing plant. With regard to the term photoacoustic as being used herein, the 'acoustic' portion may appear to be a misnomer. This is because the monitoring or detecting is relative to periodic temperature variations and mostly without regard to any associated true 'noise' or 'acoustical' characteristic, except as to that attendant to the form depicted in FIG. 2. In the latter form of FIG. 2, which utilizes a photoacoustic gas cell means the detected pressure variations are considered to be sounds in the air. Thus, as recognized by research scientist, Allan Rosencwaig, who is one of the hereinafter-mentioned referenced authors of some relevant work, the term 'photoacoustic' could be more aptly named 'photocalorimetry'. Additional more apt terms may include ion-calorimetry, thermal wave imaging, and the like.

By comparison to photoacoustic microscopy, in the somewhat allied field of photoacoustic spectroscopy of solids, the main interest is in the response differences of the solid as compared to the light frequency changes, while still using a modulated excitation beam. In either form, the modulated excitation beam, as stated hereinabove, can be any form of electromagnetic energy, such as radio frequency waves, microwaves, infrared waves, visible rays, ultraviolet rays, x-rays, and gamma rays. Particle type beams which may be used include electron, proton, neutron, ion, atomic, and molecular.

While it is recognized that many studies have been previously conducted on laser interactions with various metals, a significant amount of these have been in the non-analogous sub-categories of semiconductors and integrated circuitry used in the non-analogous per se broader field of electronic communications.

It is also recognized that there are recent and ongoing studies in these fields of Photoacoustic Microscopy, Photoacoustic Spectroscopy, and Electron-Acoustic Microscopy as evidenced by the following recent publications:

1. "What Is Photoacoustic Spectroscopy" By J. A. Noonan and D. M. Munroe; Published in "Optical Spectra", the International Journal of Optical/Electro-Optical/Laser Technology February 1979.

2. "Photoacoustic Microscopy of An Integrated Circuit" by L. D. Favro, P. K. Kuo, J. J. Pouch, and R. L. Thomas, Department of Physics, Wayne State University Detroit, Mich. 48202; Published in the "Applied Physics Letters 36 (12), 15 June 1980, by the American Institute of Physics.

3. "Electron-Acoustic Microscopy" by G. Slade Cargill I11; Published in Physics Today, Occtober 1981.

4. "Photoacoustics and Photoacoustic Spectroscopy" by Allan Rosencwaig, pg. 296, 297. Published by John Wiley & Sons, New York, N.Y. (1980).

Notwithstanding a statement on pg. 297 in the latter-mentioned article that photoacoustic microscopy appears to hold considerable promise both as general analytical tool and as a dedicated processcontrol instrument, that author is speaking specifically with regard to the semiconductor industry, and has not expanded his discussion therein to contemplate utilizing the photoacoustic effect for controlling other processes or process-controlled systems of the type being described hereinafter. Furthermore, it is believed that research personnel working in the fields of laser and ion beam processing do not normally or regularly overlap with research personnel working in the field of photoacoustics and the like. This is considered so notwithstanding that author Rosencwaig, among others, recognizes or acknowledges that photoacoustic signals can be generated through thermal excitations arising from the interactions with a sample of particle beams, such as beams of electrons, protons, neutrons, ions, atoms, or molecules; and that such signals also can be generated through the absorption of any and all forms of electromagnetic energy such as radiofrequency waves, microwaves, infrared, visible, and ultraviolet light, x-rays and gamma($\gamma$) -rays.

Proceeding herewith, reference is again made to my copending application Ser. No. 496,366 filed May 20, 1983, incorporated herein by reference and primarily directed to laser beam annealing relieving of residual stresses for layers of CVD silicon nitride and CVD silicon carbide known respectively as CVDSN and CVDSC. My copending referenced application also relates generally to the method of monitoring and controlling this laser beam annealing or treating process by a technique known as photoacoustic microscopy. As stated therein, this basic technique involves the use of a laser type visible light beam to produce localized periodic heating of a sample surface. In the example given therein involving an acoustic gas cell, the heating of the trapped gas within the cell also produced an acoustic signal. In photoacoustic microscopy, while the energy beam is concentrated on a localized spot, the spot's individual characteristics can be and are probed or monitored. Additionally, an image can be formed on and with certain associatable equipment, from the localized responses of adjacent spots, for example of an integrated circuit.

Although some of the copending application content will be repeated herein, it is to be understood that all or various parts thereof are equally considered to be incorporated herein and/or may be selectively incorporated herein by persons desiring it or finding the need thereof to more completely fulfill their understanding of this application.

Thus, the principal objective of the present invention includes utilizing the photoacoustic effect and various photoacoustic-effect-producing means to monitor and control the various aforementioned processes while those processes are being performed, as compared to utilizing the effect or process to evaluate the results at the completion of the process.

This and similar processes and the contemplated control thereof will be described in further detail hereinafter, taken in conjunction with the following illustrative drawing figures.

BRIEF DESCRIPTION OF DRAWINGS

FIG. 5 is a similar diagrammatic representation, which utilizes a piezoelectric technique; and FIG. 6 is a still further diagrammatic representation, which utilizes a so-called "Reflection" technique wherein an associated laser probe beam is reflected off the so-called "hot spot" of the heated area.

Figure 1:
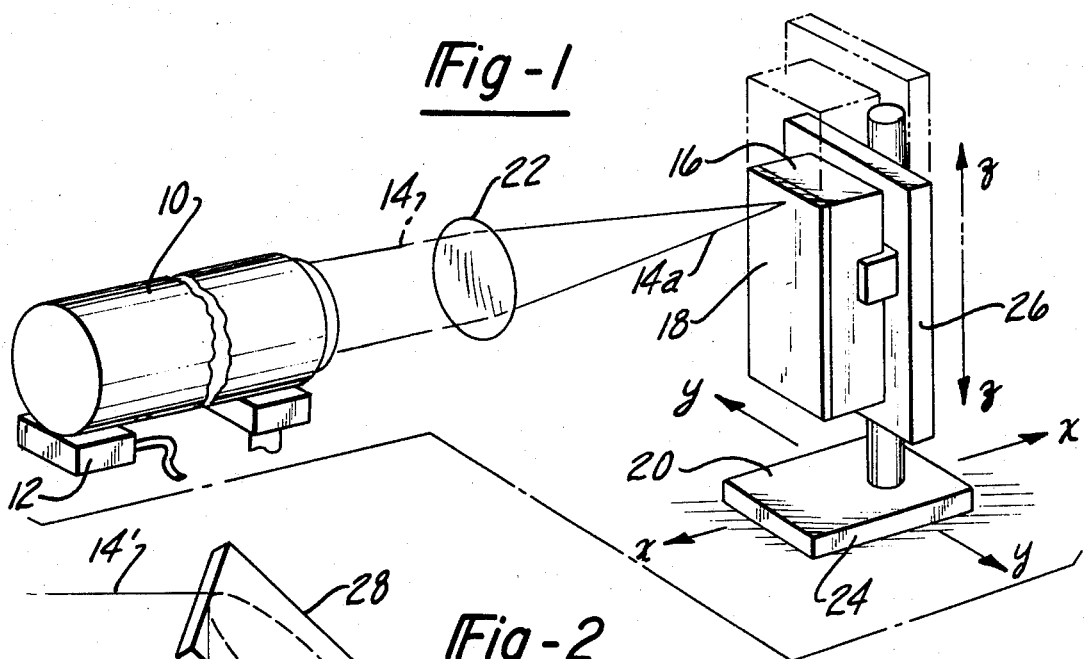
FIG. 1 is a generally diagrammatic perspective view of a movably mounted CVD ceramic coated workpiece being subjected to a laser beam annealing process to relieve the residual stresses.

As a matter of further background concerning more particularly the first to be discussed embodiments (FIGS. 1 & 2), with respect to processes involving chemical vapor deposition (CVD), two gases are intermixed so that the reaction product is deposited upon adjacent surfaces of a work piece substrate member. For example, silicon tetrachloride and ammonia in gas form can be mixed to react so as to form silicon nitride, sometimes denoted CVDSN. The silicon nitride coatings thus formed can be of almost theoretical density, of high purity, and are also very hard. When a laser is used to assist this process it is often known as LCVD. In the photolytic route, the laser frequency is chosen so that it excites the gases which then react, or else the laser light frequency excites another chemical which then causes the desired reaction. In the pyrolytic or heating route, the laser is used to heat the gases which then react, or alternatively, the laser heats the surface on which the reaction product is to be deposited and the gases react at the heated surface spot. Advantages of the LCVD include spatial resolution and control, cleanliness, rapid deposition rates, minimization of substrate distortion and rapid heating and cooling rates.

Regarding the photoacoustic effect, as applied to solids in the most common way, the effect begins with a modulated light beam incident on a solid. Part of the light is absorbed and through radiationless transitions is converted into heat in the solid. The heated surface of the solid then heats the gas in contact with it. If or where the solid heated surface is enclosed within a cell with a transparent window to allow the light to pass therethrough, this heated gas causes a pressure increase within the so-called gas cell. Then, because the light beam is modulated, the gas pressure variations are modulated at the same frequency, i.e., sound is produced. A small microphone, such as the type used in hearing aids, can be and often is used as the detector of this sound, and serves as the transducer means for converting the sound into an electrical signal. The photoacoustic effect is dependent on the absorption of the radiation and subsequent heating of the surface on which the beam radiation is incident. Thus, the technique is sensitive to both optical absorption and thermal properties which includes thermal boundary conditions. This sensitivity to thermal properties allows the technique to probe beneath optically opaque surfaces. An enclosed gas cell of this type is more commonly known as a photoacoustic cell, and represents but one technique or manifestation called photoacoustic microscopy for utilizing the photoacoustic effect to monitor and effect beam control of the aforesaid types of processes such as CVD and LCVD, or others.

Other photoacoustic microscopy process modes using different equipment are contemplated and now will be discussed in more detail. Briefly, use of an enclosed gas cell technique is not necessary when using the different so-called "Mirage" detection technique. In this "Mirage" form, the index of refraction change of the heated gas (above the surface) is used to deflect a second generally transversely disposed laser beam called a probe beam. The probe beam is not for the purpose of exciting another photoacoustic effect, but only for monitoring and detecting the basic photoacoustic effect. Thus, as the gas is heated more or less, the probe beam is correspondingly deflected more or less, and in conjunction with suitable optic transducer detector means generates certain signals useful in conjunction with ancillary signal processing means to control the beam strength or power.

A further alternative technique is use of a piezoelectric sensor which can be mounted upon the solid to detect the thermoelastic response of the solid. This latter approach allows the use of a modulated electron or ion beam for the energy source, which then requires the solid and beam to be housed within a vacuum.

These other modes/techniques including a "Reflection" technique will be further described in conjunction with additional subsequent drawing figures representative of those techniques.

Referring first to FIG. 1, a laser beam generator means 10 is suitably supported in association with an appropriate laser power supply control means 12, which together with the generator means 10 effectively generate a suitable laser beam 14 and include means to vary the power and power density of the laser as is known in the laser control art. A workpiece or substrate 16, having a CVD coating 18 is suitably removably affixed onto a portable support assembly 20 capable of effecting travel of the ceramic-coated workpiece 16 so as to selectively traverse before the convergingly focused laser beam portion 14a. Suitable lens means 22 is used to focus the beam 14 if higher power density is required than is present in the original beam. The lens size, type, and focal length or power will depend upon the particular application undergoing treatment, including whether the coated part to be treated is of planar or arcuate or other irregular form.

Support assembly 20 may be of the motorized type with dual platforms 24,26 each adapted to be moved in various directions to provide control of the workpiece in three orthogonal planes or directions x—x, y—y and z—z. This mechanism or assembly is only shown schematically because it is well known in the art and does not constitute a point of novelty in this invention.

In operation, an exemplary laser such as a CW Argon Ion laser is energized to produce the beam 14. Beam focused portion 14a terminates in a small size dot or spot area, the ultimate size of which will determine in part the laser beam power density of between approximately 1-10 KW/cm$^2$, so as to generate a surface temperature of between about 1000°-1600° C. for exposure times ranging between approximately 10-200 milliseconds. From this treatment, favorable reordering of the CVD coating is expected to occur so as to effectively relieve the inherent residual stresses found therein. The relieving of these stresses is further described in my aforesaid copending application Ser. No. 496,366 filed May 20, 1983.

Figure 2:
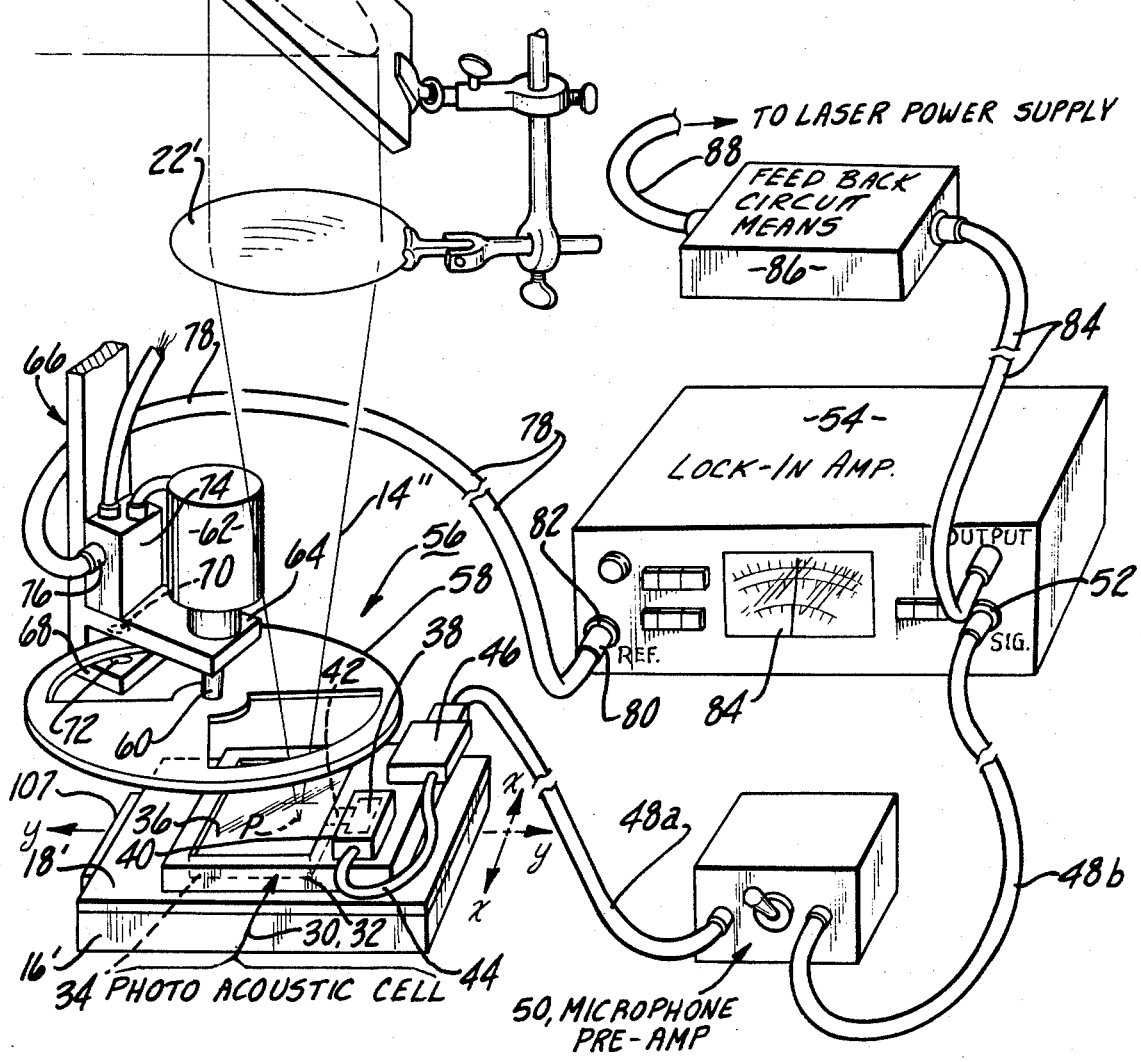
FIG. 2 is a perspective depiction of a photoacoustic effect monitoring/controlling process with the aid of at least semi-diagrammatically illustrated apparatus for effecting the monitoring by one form of photoacoustic effect generated by a modulated laser beam.

FIG. 2 represents an exemplary system and process for practicing the monitoring and control of a laser annealing process to relieve inherent residual stresses in a ceramic coated component. In this FIG. 2 example, it is understood that a suitable laser beam source means comparable to that of 10,12 in FIG. 1 is to be utilized in this embodiment, to produce a high energy laser beam 14'. Depending upon the arrangement of the system's various components, it may be necessary to use one or more mirrors to achieve the desired direction of the beam. In this example, a mirror 28 is angularly disposed to reflect beam 14' downward toward the workpiece 16'. A suitable lens 22' is appropriately supported in a position to effect focusing of the laser beam to a point P upon the workpiece 16'. Workpiece 16' is similarly coated with a layer 18' of CVDSN or CVDSC, and is to be anneal treated to relieve it of undesirable residual stresses.

A suitable photoacoustic cell assembly 30 is placed upon the coated surface 18' of the workpiece. Photoacoustic cells, primarily intended for gas or small solid or liquid samples, are commercially available from such companies as Photo-Acoustics of Rochester, Mich.; EG&G Princeton Applied Research Corporation in Princeton, N.J.; and Rofin, Inc. of Newton Upper Falls, Mass.

The cell to be described herein is to be more adaptable to surfaces of larger parts, although it utilizes the same principles. In this exemplary form, the body 32 is provided with an open bottom pocket or cell 34 covered at the upperside by a sealed transparent window 36. Adjacent to the cell pocket 34 is a smaller pocket or more shallow cell 38 open face up to the body 32, but suitably covered by a miniature microphone 40. The smaller microphone cell 38 is in gaseous and acoustical communication via a lateral shallow connecting passageway 42. Microphone wiring 44 connects with a suitable terminal connecting block 46 which preferably is attached to the main cell's body 32. Detachable conductor wire cable 48a, in turn, connects the microphone 38 first with a suitable microphone preamplifier means 50, which may be powered by switch-controlled 1½ volt battery contained therein, and then via a second conductor wire cable 48b with an appropriate insignal connector receptacle 52 on a lock-in amplifier means 54. Thus, it is apparent that the noises or signals generated within the photoacoustic cell are amplified and transmitted as input signals to the lock-in amplifier 54. An example of a commercially available lock-in amplifier is the Model 186A Synchro-Het, manufactured by Princeton Applied Research Corporation in Princeton, N.J. It is also understood that the microphone preamplifier means 50 may be of different design configuration and may be integrated with the photoacoustic cell as is the case with some commercially available cells.

To facilitate good results with these cells, the perimeter of the cell area should be in good, close contact with the coating surface. This can be achieved in various ways, one of which is to have the cell perimeter, at the underside thereof, coated with a thin layer of a suitable flexible sealing media, such as wax or wax-like substance. The cell volume should also be minimized to thereby reduce the volume of gas being pushed against or heated, and thus provide a better signal to noise ratio.

To further meet the prerequisites for establishing the photoacoustic effect, i.e., that the laser beam becomes a modulated beam while focused on a work surface spot to heat the spot beneath the photoacoustic cell window, as well as means for continuously detecting the progressively heated spots as the work piece is moved relative to the focused beam spot, the exemplary beam-modulating means designated generally by the reference character 56, will now be described.

The illustrated beam-modulating means 56, is to be considered representative of such known devices. One commercially available device is known as Series 7510

Optical Micro Chopper, manufactured by Rofin Inc., Newton Upper Falls, Mass. 02164.

Beam-modulating means 56 comprises a rotary slotted disc means 58 which includes conventional means for facilitating its removable attachment on the drive shaft 60 of the small electrical drive motor 62. Discs having a greater number of smaller size slots may be interchangeably used if desired. Motor 62 is suitably mounted upon an arm 64 of a support bracket 66 disposed to enable the focused beam portion 14" to pass through the slotted portions of the rotary modulating disc 58. Thus, it is apparent that during operation, the beam 14" is mechanically chopped or interrupted repeatedly to effect its modulation. Alternatively, the modulating means may chop or modulate beam 14" so that the disc 58 is not exposed to excessive laser power densities. The beam is preferably chopped in the audio frequency regime of approximately between 1 $H_z$ and 20 $KH_z$. The device further includes optical emitter-detector means disposed on opposite sides of the disc in a bifurcated portion 68 of the bracket 66. The emitter-detector means may include a small lamp or a light emitting diode (LED) 70 as the light source and an opposed small detector diode 72 such as a silicon photo detector, or any similar type detector which responds to a light source so as to detect the chopped or interrupted light source 70. Such means may alternatively include small Infrared (IR) wave emitter-detector means. One commercially available form of optical emitter-detector sensor means is called an IR Sensor Limit Switch manufactured by General Instrument Company of Palo Alto, Calif. 94304.

Thus, the emitter-detector means 70,72 are appropriately wired to form part of the circuit means which effects conversion of the rate at which the laser beam is chopped into an appropriate electrical signal with at least part of the circuit means being within the bracket-mounted box housing 74. Housing 74 is provided with an appropriate terminal receptacle to receive one connector end portion 76 of a flexible coaxial conductor cable 78, of which the opposite end connector portion 80 is adapted to be received in reference signal connector receptacle 82 of the lock-in amplifier 54. Therefore, the latter described means 70–80 establish an electronic reference signal input to the lock-in amplifier, in a parallel manner to the photoacoustic cell's pressure change modulated signal input at the aforesaid other receptacle 52, at the opposite side of said amplifier. The two distinct input signals into the lock-in amplifier 54 are processed internally in a known manner to provide a particular D.C. voltage, the voltage signal thereby being visually discernable on the voltage meter 84 of the amplifier 54. The produced D.C. voltage is proportionate to that part of the input signal that is at the same frequency as the reference signal and at a set or chosen phase angle with respect to the reference signal. It is understood by those familiar with the art that the photoacoustic effect has both a magnitude and phase value with respect to the beam modulation.

The resultant signal is then transmitted out via conductor cable 84 as an output signal to an appropriate feed back circuit means 86 which may include microprocessor and/or other computer means in conjunction therewith, and then via a further conductor cable 88 to a laser power supply means (such as 12 in FIG. 1) to effectively and essentially instantaneously modify the laser beam strength or wave amplitude as conditions and desired mode may dictate. Use of lock-in amplifiers and related control circuit means are well known to electrical control engineers working in the art. It is understood that if a pulse type laser is used, then the control would be directed to controlling the pulse power, the pulse width, or within limits, the repetition rate of the pulsing means associated therewith. Thus, when the laser heated spot within the gas cell is discerned by the photoacoustical monitoring as becoming too hot, thereby endangering burning through the CVD layer or imparting any other adverse treatment effect, the microprocessor and feed back circuitry means are used to effectively control the laser beam's effective strength for the required time, including any thereafter increase or decrease or maintaining of the desired level of power as required during and throughout the laser treating or annealing process. This composite process is expected to favorably relieve the detrimental residual stresses.

One contemplated use of this novel process will be more particularly applicable to monitoring and more effectively controlling the laser beam during laser treatment on CVD ceramic-coated substrates involving inhomogeneous characteristics such as where the substrate requires or otherwise has variations in layer thickness or density, thus resulting in non-uniform optical and thermal absorption properties. As a result, such conditions would inherently require close monitoring and accurate control of the laser beam intensity.

Discussion will now relate to the utilization of some other perhaps lesser known monitoring and modulating techniques which I contemplate utilizing in conjunction with or as part of the photoacoustic effect for detecting or monitoring of excessive hot spots of a modulated energy source beam. The selected beam may be a laser beam or an ion beam, or other similar high energy beam or light source. As already briefly mentioned earlier herein, these other modes include use of an infrared (IR) detector technique, the so-called "Mirage" technique, the piezoelectric detector technique, and the "reflection" technique.

Figure 3:
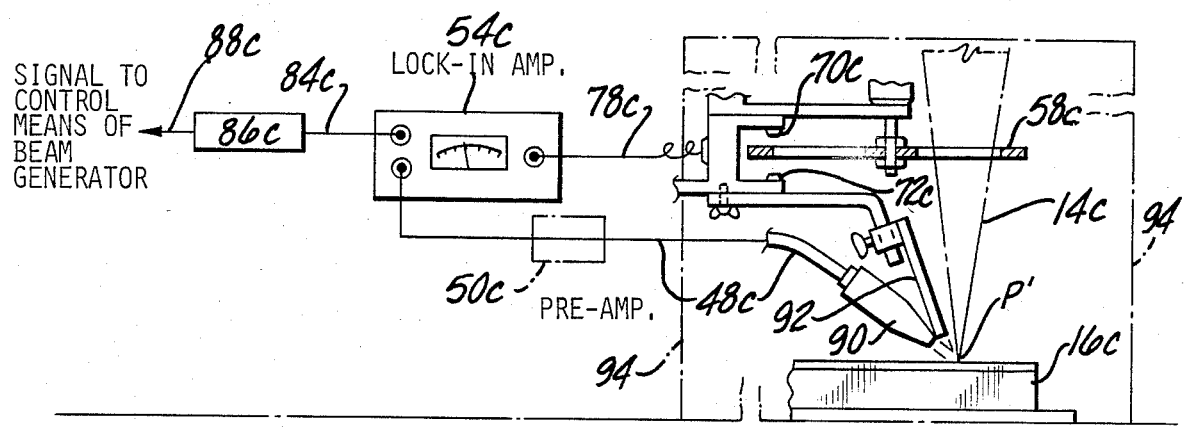
FIG. 3 is a diagrammatic representation of means producing a photoacoustic effect utilizing an Infrared (IR) detector means for monitoring and controlling a laser beam processing.

An exemplary arrangement using an IR detector technique is illustrated in FIG. 3. As shown, an intense light beam such as a focused laser beam 14c, suitably modulated as by a rotary chopper disc 58c or other apt means, is directed upon the coated substrate or workpiece 16c at point P'. The modulated beam generates a desired heated area upon the workpiece as the workpiece is traversed before it, or as the beam is traversed across it, and simultaneously creates a certain level of heat and accompanying IR radiation, the signals of which are detectable by and picked up by an IR detector means. The IR radiation is the product of temperature and emissivity. For certain products, depending upon their character, it may be assumed that the emissivity thereof will remain generally the same, in which event then any detectable changes are due to temperature changes in the surface.

A known type of IR detector means 90 is appropriately supported closely adjacent to the focused beam spot or point P'. Because IR detectors have some sensitivity to visible light, it may be necessary that a shield means 92 be suitably interposed between the beam and the IR detector 90 to screen out the beam's intense visible light. For thin specimens the detector means 90 may be disposed to view the back of the specimen or workpiece instead of the front. Because everything inherently emits some IR radiation, the detector 90 is adapted to detect and indirectly measure the temperature of the focused spot or point P' through attendant IR radiation or emission when the emissivity factor is known of the material being treated. Thus, the detected IR signal is fed through a first conductor cable means 48c, via an optional separate preamplifier means 50c, into one input side of the lock-in amplifier means 54c. In the manner generally described relative to FIG. 2, similar type optical emitter-detector means 70c, 72c are used therewith to generate a reference input signal via further cable means 78c into the lock-in amplifier means 54c. The two input signals are appropriately processed internally in a known manner and a D.C. voltage output signal is feedback via conductor cable means 84c to an appropriate feed back circuit means 86c, then via conductor 88c to control means on a suitably corresponding beam generator means (not shown). In this manner the appropriate control is achieved and maintained during the laser treating process. In the gas cell photoacoustic detection approach on solids, the gas cell volume should be minimized for a better signal to noise ratio. This consideration leads to small gas cell detectors so the IR technique has an advantage relating to the treatment of larger size work pieces.

The use of the IR detector mode or technique is such that it can be carried out equally well under normal atmospheric conditions, and also within a vacuum. The broken box-like outline denoted 94 in FIG. 3 is diagrammatically representative of housing means which can be evacuated to enable the process to be carried out within vacuum conditions. However, this would also necessarily limit or restrict access to the object being processed.

Although a chopper disc means has been shown and described as an exemplary means for effecting beam modulation, it is understood that an alternate mechanical (chopping) means may include vibrating reed means if chosen to have the correct frequency of vibration. It is preferable that such a reed would vibrate at a single frequency like a tuning fork. Still other means for effecting beam modulation may include acousto-optic devices, one form as known commercially being called an Acoustic Optic Modulator, such as manufactured by Intra Action Corp., of Bellewood, Ill. 60104; or some still further different form of direct control of the beam.

Figure 4:
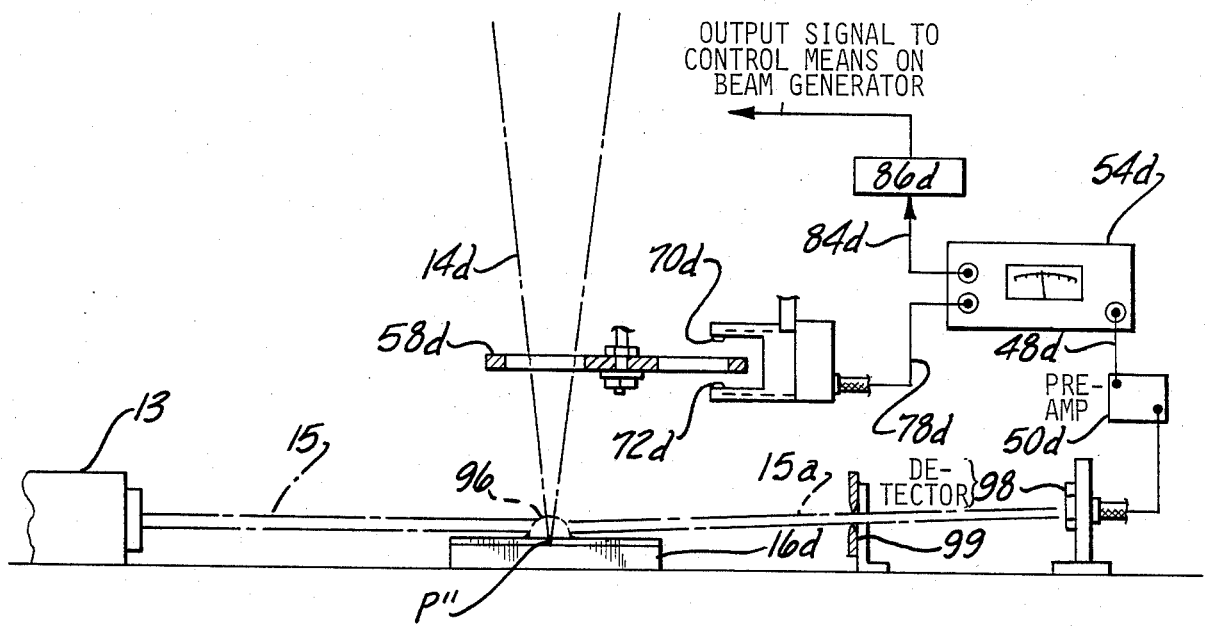
FIG. 4 is a similar diagrammatic representation of means producing a photoacoustic effect but utilizing a so-called "MIRAGE" technique, which is related to changes in the index of refraction, for monitoring the heated spot and the attendant control of the excitation beam thereof.

Reference to FIG. 4 and to an exemplary "Mirage" effect technique or system will now be described. A similar high energy main beam 14d, such as a laser beam, is similarly focused into a point P" upon a CVD coated or other suitably coated workpiece 16d. Beam 14d is modulated by any suitable means, such as chopper disc means 58d. The focused main beam 14d generates a heated area or hot spot in the area of P", and in so doing heats up the air above the surface of the solid workpiece 16d. The area of heated air is designated by the exaggerated bump or dash ripple line 96. A further suitable beam generating means is used to generate a probe beam for merely monitoring and detecting the selected photoacoustic effect set by beam 14d. Such a probe beam does not excite or generate a second photoacoustic effect. Thus, for this exemplary embodiment a second laser generator means, shown fragmentarily at 13, generates a second laser beam 15 which is used as a probe beam. Beam 15 may be of the Helium-Neon type, and is directed so as to pass closely above the surface of the workpiece 16d while intersecting the beam 14d just above the hot spot P". Upon its passing through the heated area 96, with the attendant changed lower index of refraction, the beam 15 is slightly deflected upwardly as shown at 15a in FIG. 4. If the beam 15 is slightly off the center of excitation beam 14d, it will also be deflected to the side as well as upwardly. This can be used to provide some additional information about the heated spot. Deflected beam 15a is intercepted by a strategically placed detector means 98 aptly supported beyond the workpiece 16d. It is preferred that during the product treating process or other process to be controlled, as long as the temperature of the surface area being monitored is detected as being within a predetermined acceptable temperature range, then there is no need to alter the power setting of laser generating means 13. Thus, the detector means placement is such that during the aforementioned favorable operable time periods, only a predetermined insignificant percentage of the deflected probe beam directly impacts upon a potential signal-generating cell portion of the said detector means 98.

Various suitable auxiliary means may be used to assure that at predetermined times or for a given operational condition, only a certain predetermined percentage of the beam will be cast upon the detector. One such auxiliary means, to assure the foregoing condition, is to use a strategically placed slotted barrier means 99, or at least a partial barrier, which would intercept a predeterminable portion of the beam under certain circumstances. More preferably, the barrier means 99 would be of adjustable character, not only to vary the slot opening but the respective heights of respective upper and lower half portions thereof. The detectors may vary in area size to meet varying specific needs. The detectors also may be wired into circuits of different operative character. That is, if an acceptable temperature range is being maintained for the part being monitored or treated, and the probe beam is so positioned that a predetermined limited insignificant portion of the deflected beam, as controlled by the barrier means 99, is impacting upon the potential signal-generating detector means, then the control settings of the main excitation beam are left in status quo until an unsatisfactory imbalance occurs. In the latter event and upon the probe beam becoming deflected to a greater extent so as to impact more significantly upon the detector means, the detector transforms the changing optical signal to an electrical signal of usually greater predetermined magnitude and/or character to effectively cause the feedback circuit means to take appropriate corrective action of the beam control means. Alternatively, the circuitry could be designed for an opposite arrangement, i.e. as when the probe beam is hitting more fully and directly upon the detector means for a given satisfactory performance setting, it effects a stable control of the beam generator means until a different unsatisfactory imbalance might occur, as by loss of beam strength hitting the detector. If this latter condition occurs, then a different preprogrammed signal is emitted to effect the predetermined desired corrective control.

The detector means may comprise a photocell type, a silicon photo detector, a cadmium sulfide or similar light-responsive type detector which is capable of transforming the light beam signal into an electrical signal.

A more specific exemplary description will now be reviewed for the aforedescribed system and process, assuring that proper controls can be administered when and if the monitored character of the surfaces under treatment of the basic beam 14d is detected as changing from the desired norm. For example, if the spot P" begins to overheat, increasing the ambient temperature in area 96 beyond the acceptable range, then beam 15a is deflected to a sufficiently greater extent as to more fully cover the detector 98, and cause the signal-generating cell portion to emit a stronger signal. This signal is fed into the lock-in amplifier 54d, via a preamplifier means 50d, if needed, and the related conductor cable 48d. A similar reference input signal is generated by emitter-detector means 70d and 72d of the main excitation beam's modulating means in the same aforedescribed general manner. This signal is similarly carried via conductor cable 78d into the lock-in amplifier means 54d. These signals are also then processed internally by the lock-in amplifier means 54d to produce a D.C. voltage output signal which is conducted via cable means 84d and via feedback circuit means 86d to the control means on the beam generator, neither of which are shown in this FIG. 4 embodiment.

As previously indicated, the photoacoustic effect is considered to generate electrical signals with values representative respectively of both the magnitude and phase thereof. Under certain circumstances, it may be that either only the magnitude part of the signal or only the phase part of the signal will be utilized by the signal processing means for maintaining and/or modifying as needed the beam-generating power control means of a processing system. Under other circumstances, both the magnitude and phase representative signals will be used collectively for maintaining and/or modifying the beam-generating power control means, as needed.

In any of the arrangements described herein, or in equivalent arrangements, where the generated signal may prove to be strong enough, compared to background noise, then use of either the preamplifier and/or lock-in amplifier means may not be necessary. In such event, the signal is simply rectified and applied directly to the applicable control means.

Although the illustrative FIG. 4 embodiment depicts only a single detector means 98 in conjunction with the so-called "Mirage" mode of detecting an acoustical effect, it is to be understood that an appropriate multi-detector array means, together with the appropriate electronics, may be desired for some embodiments to detect various degrees of deflected beam positions and to generate the appropriate corrective signal. Separate control means are needed to respectively increase the power setting as well as to decrease the power setting, depending upon the needs of the particular system or process being controlled. In instances where a pulse type laser is used, appropriate control circuitry will be used so that the produced DC voltage signal from the lock-in amplifier will be useful to control the laser generator's pulse power, pulse width, or repetition rate, within limits.

FIG. 5 is a diagrammatic, fragmentary representation of a process using ion beam implantation. In association therewith is a contemplated piezoelectric type detecting means to effect desired monitoring and control of the ion beam, which will now be described. Ion beam generator means 100 generates within an enclosed vacuum area (not shown) an ion beam 102 which is aimed toward a subject workpiece 104 to be implanted with ions. Workpiece 104 has attached thereto detector means 106 in the form of a piezoelectric transducer. Although transducer 106 is shown on the underside of workpiece 104, it is understood that it may be alternatively positioned on an end or top side as indicated in broken outline at 106'. It is preferable that the transducer be applied to a side of the workpiece in a manner which avoids application of any compressive force to the transducer. In this form, an electric field 108, established by a laterally applied positive voltage source, from a suitable power generator 109 is used to modulate beam 102 by electrostatically deflecting or steering the ion beam as at 102a back and forth across the slot 110 of a slotted modulating barrier 111. It is understood that if the voltage applied is positive, the beam will be deflected away in a given direction, and if negative it will deflect in the other direction. It is further understood that the main excitation beam may be other than an ion beam, including electron beams, particle beams, neutron beams, and intense beam forms, such as an ultraviolet beam, coming within the electromagnetic spectrum, along with associated appropriate modulating means.

Referring further to FIG. 5, responsive to the bombarding of ions against the surface of the workpiece or substrate 104, a modified surface 104a denoted in an exaggerated manner by the dashed line 104a, evolves as the result of ion implantation. The modulated impact of the ions induces repetitive heating and cooling which, in turn, causes repetitive expansion and contraction. This repetitive expansion and contraction initiates a vibration effect accompanied by the induced mechanical waves depicted at 112. Thus, the induced mechanical waves excite the piezoelectric detector 106 producing an electrical signal.

A modulating reference signal from generator 109 is transmitted via conductor 109a into the lock-in amplifier 54e. The other input signal induced by the thermoelastic properties of the material via the transducer 106 is then conducted via conductor line 48e into the lock-in amplifier 54e, in the same general manner as described relative to FIGS. 3 and 4. An optional preamplifier means denoted in broken lines at 50e may be incorporated into the circuitry, if needed. After the two input signals are processed within the lock-in amplifier 54e, an output D.C. voltage signal is conducted via conductor line 84e, and thence via appropriate feedback circuit means 86e, to a corresponding ion beam control means (not shown). From this exemplary arrangement, it is equally apparent that use of this photoacoustic effect (or photo-calorimetry effect) in conjunction with utilizing piezoelectric transducer detected vibrations of the material being treated or processed, does provide a feasible and unique manner of controlling ion beam processing. This is achieved in a similar manner as used to control the laser beam processing examples of FIGS. 2, 3, and 4.

Before proceeding with still a further alternative detecting technique relative to FIG. 6, it is to be understood that a process control system or method may embody at least two separate photoacoustic detecting techniques which may be respectively used to function in an individual manner yet collectively with the apparatus or system performing the overall control method. An example of this can be seen by again referring to FIG. 2 which had basically shown the gas cell means and technique. For exemplary purposes, a second detection technique and means is shown only by the addition of another piezoelectric transducer means 107 therein, shown attached to the left-hand side of the workpiece 16'.

Reference now will be made to the still further "Reflection" mode or technique, as depicted schematically in FIG. 6. In FIG. 6, the processing laser beam is denoted 14f which is focused to a small treating spot or point P''' upon the CVD coated substrate or other type workpiece 16f undergoing a treatment process. The beam 14f may be disposed with its center axis "a" generally perpendicular to portion of the workpiece being treated. Beam 14f is suitably modulated, as by the chopper disc means 58f; in conjunction therewith is an appropriate optical emitter-detector means, which may be of the type shown in and described relative to FIG. 2 and 4. The optical emitter-detector means, designated 70f,72f, is wired into the circuit means so that the generated optical signal is converted into an appropriate electrical signal. This latter reference signal is fed via conductor cable 78f into the left side of lock-in amplifier means 54f. When the surface of workpiece 16f becomes heated, the heated spot expands and bulges out slightly as a manifestation of the thermo-elastic effect. This is shown by the greatly exaggerated bump line 97. Also the air above the spot is heated as usual in the photoacoustic effect forming the area of heated air designated by the dash ripple line 96'. In this embodiment, the incoming portion of the probe beam is denoted 115, and is aimed at the heated area P''' at a preselected angle which may be determined at least in part by the contour of the workpiece being treated. In the illustrative example shown in FIG. 6, the workpiece 16f may be a turbine blade or other irregularly curved or shaped component, where practical application of the "Mirage" technique would be substantially precluded on its concave surface. Therefore, use of this so-called "Reflection" technique may be preferred. In this arrangement, the normal line denoted "a" which is normal to the surface at the point of impact of the incoming beam 115, the incoming beam 115, and reflected beam 115' all lie in a common plane. As shown, under the laws of reflection the angle $\theta$ of the incoming beam relative to the said normal line "a'" is equal to the angle $\theta'$ of the reflected beam 115' relative to the same normal. The reflected beam is deflected by both the change in surface contour and the thermal lensing utilized in the "Mirage" technique. It is possible that other processes are also contributing to the deflection in this newly reported technique. The incoming beam 115 is reflected off of the expanded heated areas 96' and 97 as shown, and is picked up by strategically placed detector means 98'. Thus, by monitoring the deviation of the probe beam reflection 115' from the hot spot, an appropriate correlation can be made between the detected deviation and the degree of heat being applied by the processing beam so that an appropriate range of signals is generatable, and is accordingly generated by the transducer of detector means 98' for input via conductor cable 48f, and the optional preamplifier means 50f into the lock-in amplifier means 54f. These two input signals are then processed by the lock-in amplifier means to produce a meaningful output signal, in the manner described relative to the previous embodiments. Thus, the output signal is transmitted thru an appropriate feedback circuit means 86f which in turn effectively controls the processing beam 14f.

The "Reflective" technique needs a moderately reflective surface, and thus would not be as appropriate for use on very absorbent or very rough surfaces or surfaces having a very low coefficient of expansion. This "Reflective" mode is considered to be potentially more sensitive with regard to strength of signal to background noise, than obtainable with some of the other techniques.

From the foregoing descriptions, a summary now follows of some of the relative advantages and disadvantages for the several described modes or techniques of detecting the photoacoustic effect.

PHOTOACOUSTIC (EFFECT) DETECTION TECHNIQUES

Gas Cell

Advantages: Easy to apply to a regular surface; most developed technique.

Disadvantages: Requires coupling gas. Requires cell of relatively small size and suitable shape to fit part, thus making it somewhat more difficult to implement on large parts or parts of irregular shape.

Mirage

Advantages: Where imperfection cracks appear in a material being treated or monitored, this technique results in better crack signatures or definition; lower modulation frequencies are typical allowing deeper profiling.

Disadvantages: Not appropriate for concave surfaces; not appropriate for use in a vacuum. Requires careful alignment of the parts surface, the probe beam, and the focal spot of the excitation beam; provides slower scans than available with the gas cell technique.

Piezoelectric

Advantages: Will work on most component shapes; will work in a vacuum. Could be used to gain information on the interior of the part that the mechanical wave traverses. Fast scan rates are possible.

Disadvantages: Poor where material has low coefficient of thermal expansion or absorbs the mechanical vibrations. Requires good acoustical matching to the sample. Could be misleading if mechanical resonances are excited in the part. The conversion efficiency of thermal waves into acoustical waves is very low.

Infrared (IR)

Advantages: Works well in air and in a vacuum.

Disadvantages: Signal generated is the product of both emissivity and temperature, rather than only temperature.

Reflection

Advantages: Good for use on surfaces of irregular shape; shows promise of a relatively strong signal. Fast scan rates may be possible.

Disadvantages: Not very appropriate for absorbing surfaces, or for rough surfaces; i.e. requires surfaces with a moderate reflectivity. More complex equipment and alignment necessary.

CONCLUSION

From all the foregoing description, it is apparent that the objectives and the advantages of this application have been achieved, by the unique processes hereof in conjunction with the variously described indirect modes of monitoring and using temperature variations of the working portions of the workpieces.

Although the invention has been described and illustrated with respect to several embodiments, it is readily apparent that those skilled in the art will be able to make still other modifications of the exemplary ones without departing from the spirit and scope of the invention as defined in the appended claims.

What is claimed is:

1. A novel method for controlling various processes by utilizing a photoacoustic effect principle, whether or not the various processes are with regard to a solid or non-solid fluid medium, said processes using and requiring control of a primary excitation beam of the type including laser beams, microwave beams, x-rays and other electromagnetic wave beams, as well as ion, electron, particle and molecular beams, and which processes include the use of appropriate beam-generating means and beam-generating power control means in conjunction therewith, said novel method comprising the steps of:
  (a) generating and modulating in a pulsing manner a selected type of primary excitation beam;
  (b) directing said beam at a workpiece or work area to be treated thereby, so as to create a temperature variation thereat, and so as to establish a photoacoustic effect;
  (c) continuously monitoring the beam-impacted work area by one of several different photoacoustic effect detection techniques which includes means for detecting the characteristic temperature variation in said area, which variation can manifest itself as pressure, index of refraction, thermoelastic, or infrared (IR) radiation changes, considered singly and in various combinations;
  (d) said monitoring step resulting in generating an electrical signal by appropriate transducer means, with the signal to be used by ancillary signal processing means;
  (e) said monitoring further using the selected type photoacoustic effect detecting means for detecting any such work area temperature variation outside of a predetermined acceptable - unacceptable temperature range which is indicative that the given process with which this control procedure or process is being used is in need of correction, and
  (f) using said electrical signal as generated in conjunction with said monitoring means of sub-paragraphs (c) (d) (e), together with ancillary signal-processing control circuit means for effectively maintaining and modifying as needed the beam-generating power control to assure proper overall processing.

2. The method of claim 1, wherein said monitoring and detecting includes utilizing a gas cell technique utilizing related gas cell means for detecting the photoacoustic effect and an attendant characteristic temperature variation of the treated work area.

3. The method of claim 1, wherein said monitoring and detecting includes utilizing a "mirage" type photoacoustic detecting technique together with "mirage" - generating probe-beam means and attendant photodetection transducing means for detecting the attendant characteristic temperature variation of the treated work area.

4. The method of claim 1, which includes using a piezoelectric detector type technique by using piezoelectric detector-transducer means for detecting the characteristic temperature variation of the treated work area.

5. The method of claim 1, which includes using an infrared (IR) detector type technique together with infrared (IR) detector means for detecting the attendant characteristic temperature variation of the treated work area.

6. The method of claim 1, wherein said monitoring and detecting includes utilizing a reflection type photoacoustic detecting technique together with reflection generating probe beam means and attendant photodetection transducing means for thereby detecting the attendant characteristic temperature variation of the treated work area.

7. The method of claim 1, wherein the photoacoustic effect includes electrically generated signals representative respectively of both the magnitude and phase thereof, but using only the magnitude part of the signal for maintaining and modifying as needed the beam-generating power control means.

8. The method of claim 1, wherein the photoacoustic effect includes electrically generated signals representative respectively of both the magnitude and phase thereof, but using only the phase part of the signal for maintaining and modifying as needed the beam-generating power control means.

9. The method of claim 1, wherein the photoacoustic effect includes electrically generated signals representative respectively of both the magnitude and phase thereof, and using both the magnitude and phase representative signals for maintaining and modifying as needed the beam-generating power control means.

10. The method of claim 1, wherein at least two separate photoacoustic detecting techniques are used individually to determine the photoacoustic effect in their respective ways to thereby collectively effect the beam-generating power control of sub-paragraph (f).

11. The method of claim 1, which includes processing the electrical signal of sub-paragraph (d) by means of a lock-in amplifier means which uses as its reference a further signal generated in conjunction with a beam-modulating means, said further signal being representative of the frequency of the beam modulation; and, which processing is done to separate the photoacoustic signal from various interfering signals so that it can be effectively used by said ancillary control circuit means of sub-paragraph (f).

12. Apparatus for controlling various different processes, whether with regard to a solid or non-solid fluid medium, using any one of various primary excitation beams including laser beams, microwave beams, x-rays and other electromagnetic wave beams, as well as ion, electron, particle, and molecular beams, said apparatus including:
  (a) beam generating means and beam-generating power control means operatively connected therewith and with a power source;
  (b) means for modulating said beam in a pulsing manner;
  (c) means for directing the beam to and thereby heating of the area under treatment thereby creating temperature variation in the workpiece or work area;
  (d) means for monitoring the beam-impacted work area, said monitoring means utilizing one of several different photoacoustic effect detection techniques and related means for achieving it, for detecting the characteristic temperature variations in the workpiece or other beam-directed work area, which temperature variations can manifest themselves as pressure, index of refraction, thermo-elastic, or infrared (IR) radiation changes, considered singly and in various combinations;
  (e) transducer means in conjunction with and constituting part of said monitoring means to convert a detected temperature-variation-induced manifestation of the photoacoustic effect into an electrical signal for input to and usage with signal processing means;

(f) said means for monitoring of sub-paragraph (d) also including means for detecting any such work variations of paragraph (d) which are beyond a predeterminable acceptable-unacceptable temperature range which is indicative that the given process with which this control apparatus is being used is in need of correction; and (g) control circuit means including signal processing means which are collectively operable to effectively maintain and modify as needed the beam-generating power control means to assure the proper overall processing.

13. The apparatus of claim 12, wherein said means of sub-paragraph (b) for modulating the beam include mechanical chopping means.

14. The apparatus of claim 12, wherein said means of sub-paragraph (b) for modulating the beam include acousto-optic means.

15. The apparatus of claim 12, wherein said means of sub-paragraph (b) for modulating the beam include direct electrical control means.

16. The apparatus of claim 12, wherein the photoacoustic detecting means of sub-paragraph (d) includes photoacoustic gas cell means.

17. The apparatus of claim 12, wherein the photoacoustic detecting means of sub-paragraph (d) is of the "mirage" type which includes attendant probe beam mean including a generated probe beam, and related photo detection transducing means, said probe beam disposed to pass closely adjacent and generally parallel to the beam-impacted area of said primary excitation beam.

18. The apparatus of claim 12, wherein said photoacoustic detecting means of sub-paragraph (d) is of the piezoelectric transducer type and includes piezoelectric transducer means.

19. The apparatus of claim 12, wherein said monitoring and detecting means of sub-paragraph (d) include infrared radiation detector means.

20. The apparatus of claim 12, wherein the photoacoustic detecting means of sub-paragraph (d) is of the reflective type which comprises reflecting probe beam means, and a related transducer means strategically disposed to intercept and receive the reflected probe beam, said latter-mentioned related transducer means constituting the said transducer means of sub-paragraph (e).

21. The apparatus of claim 12, further including lens means in conjunction with certain apparatus arrangements, said lens means adaptable for focusing the generated primary excitation beam into a relatively small spot area or point to be directed to a work area as part of a process being controlled by this apparatus.

22. The apparatus of claim 12, further including means for effecting relative movement between said generated beam and a workpiece or work area undergoing processing or treatment by said primary excitation beam.

23. The apparatus of claim 12, wherein said control circuit means of sub-paragraph (g) further includes lock-in amplifier means as part of the signal processing means, and within which lock-in amplifier means the generated signal of sub-paragraph (e) is processed together with a reference signal generated in conjunction with said modulating means of sub-paragraph (b), to thus separate the photoacoustic signal from any interferring background signals to facilitate more effective use of the photoacoustic signal as part of said control circuit means.

24. A method for optimizing uniformity of treatment of the surface of a solid work piece having non-uniform optical and thermal absorption properties on or near the surface with a variable intensity primary excitation beam, said method utilizing a photoacoustic effect principal, a power control, and a photoacoustic effect detector; said beam intensity being controlled by said power control; said method being primarily directed to maintain optimum beam intensity on the surface being treated by varying said beam intensity as a function of the physical properties of a treatment area; said method comprising the steps of:

a. imaging said beam on said treatment area to raise the temperature of the surface;

b. modulating said beam in a pulsing manner to induce a photoacoustic effect having a magnitude and phase at said treatment area;

c. detecting said photoacoustic effect produced by said pulsing beam with said photoacoustic detector means; said detector means generating an electrical signal output corresponding to said magnitude and phase of said photoacoustic effect, which output is proportional to the temperature at the treatment surface;

d. processing said output to conform the signal to a condition acceptable by said power control;

e. directing said output to feedback to said power control;

f. adjusting the power control in response to the feedback, thereby varying said beam intensity to maintain said optimum beam intensity on said treatment area;

whereby said work piece receives a substantially uniform treatment relatively independent of non-uniform optical and thermal absorption properties on or near the work piece surface.

25. The method of claim 24 wherein said primary excitation beam is of the type including laser beams, microwave beams, x-rays and other electromagnetic wave beams.

26. The method of claim 25 wherein said photoacoustic detector means is of the type including gas cell, "mirage," piezoelectric, infrared and reflection.

* * * * *